UNITED STATES PATENT OFFICE.

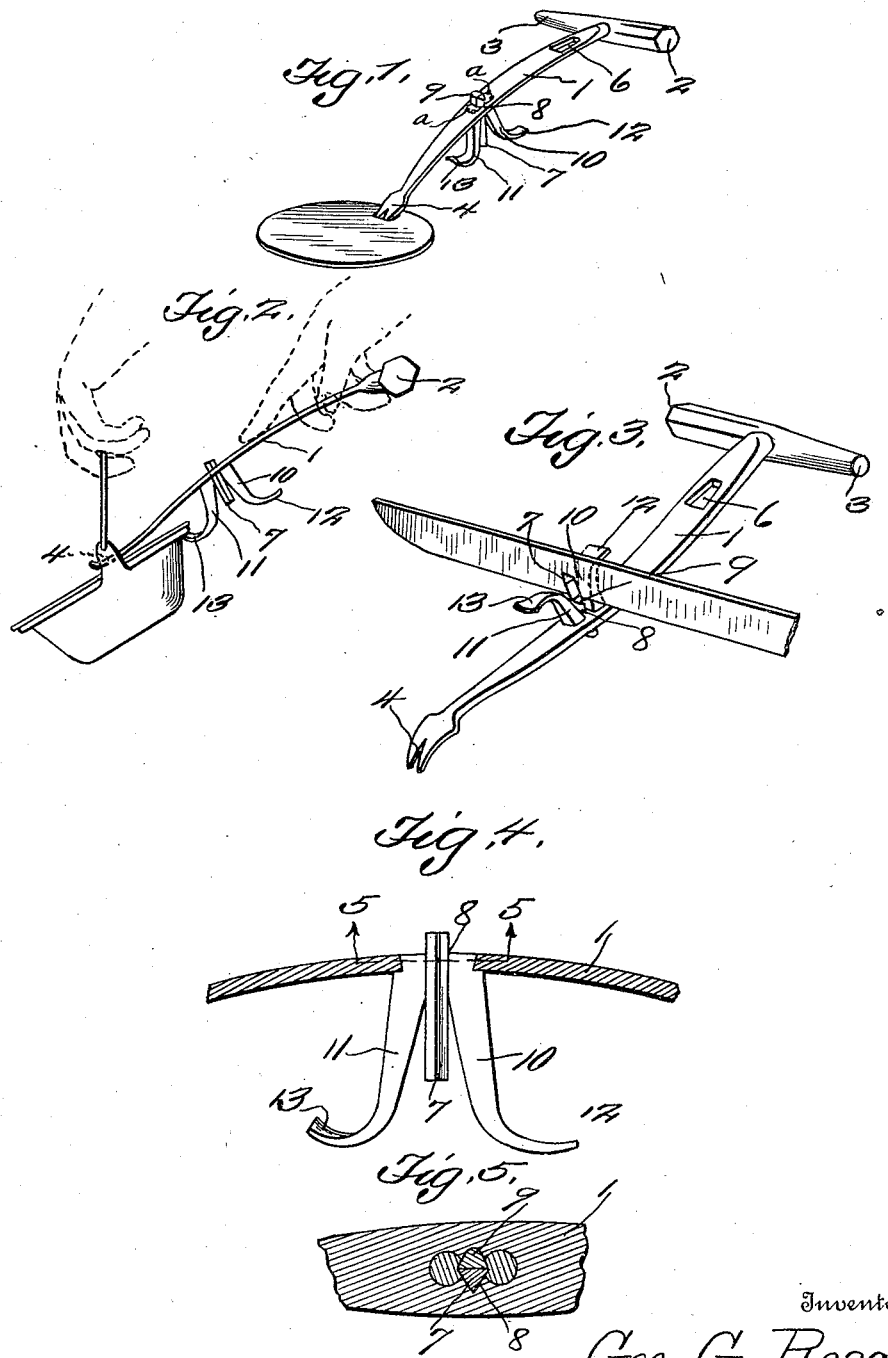

GEORGE G. ROSS, OF BLADEN, NEBRASKA.

KNIFE-SHARPENER.

1,074,295.  Specification of Letters Patent.  Patented Sept. 30, 1913.

Application filed July 24, 1911. Serial No. 640,270.

*To all whom it may concern:*

Be it known that I, GEORGE G. ROSS, a citizen of the United States, residing at Bladen, in the county of Webster and State of Nebraska, have invented a new and useful Knife-Sharpener; and I do hereby declare the following to be a full, clear, and exact description of the invention, such as will enable others skilled in the art to which it appertains to make and use the same.

This invention relates to a new and useful knife sharpener, in the form of a household utensil or article.

As an object of the invention, it is the aim to provide a device of this nature, adapted for not only sharpening knives principally, but also adapted for supporting kettles and the like, and at the same time hold the lid of the kettle on, so as to drain the water from the cooked article in the kettle. Incidentally this device may be used as a tack driver, and puller, and as a wrench.

The invention comprises further features and combination of parts, as hereinafter set forth, shown in the drawings and claimed.

In the drawings:—Figure 1 is a view showing the household utensil utilized as a lid lifter. Fig. 2 is a view showing the device holding a kettle, so as to hold the lid thereon while draining the contents therein. Fig. 3 is a view showing the device used as a knife sharpener. Fig. 4 is a longitudinal sectional view partially through the device. Fig. 5 is a sectional view on line 5—5 of Fig. 4, transversely thereof.

Referring to the drawings 1 designates the metal shank of the tool, which is provided at one end with two hammers, the ordinary hammer 2, and a magnetic tack hammer 3, while the other end thereof terminates in a tack puller 4. The shank for a greater part of its length is substantially flat, and adjacent the hammer end an opening 6 is provided, by which burs, taps and the like may be adjusted.

Intermediate the opening 6 and the tack puller a projection 7 is secured in an opening 8 of the handle. This projection 7 in cross section is triangular, and constructed of case hardened steel. To hold the projection 7 (which constitutes a knife sharpener) in the opening, a three cornered wedge key 9 is provided, which is forced in the opening 8. By this method the knife sharpener or projection 7 may be removed.

Arranged on each side of the knife sharpener and extending at angles thereto are knife guides 10 and 11, between either one of which and the knife sharpener the blade of the knife may be shoved backward and forward with the knife edge in the apex of the V-shaped opening between the guides and the knife sharpener. The guide 10 terminates in a laterally extending portion 12, which may be adapted for prying can lids open. In alinement with the opening 8 are two openings 8$^a$, one upon each side of the opening 8, while the guides 10 and 11 are provided with lugs 8$^b$. These lugs of the guides, and the walls of the openings 8$^a$ are correspondingly beveled, in order to detachably secure the guides in place. In order to further detachably secure the guides in place, the shank 1 of the tool adjacent the openings 8$^a$ and the extremities of the lugs are indented, as shown at $a$, particularly seen in Fig. 1. In this manner the guides are detachably anchored, thereby rendering the guide renewable or replaceable. The guide 11 also terminates in a laterally extending portion 13, which is curved slightly in cross section at its extremity, so as to engage under the annular bead of the pan or kettle, in order to assist in supporting the kettle, when draining the water from the cooked food, as shown in Fig. 2. When the curved portion 13 is supporting the kettle in such a manner, the tack pulling end of the tool is disposed against the lid of the kettle, for holding the same in place, while the left hand of the cook holds the handle of the kettle, which is tilted slightly.

From the foregoing it will be observed that there has been devised a simple, novel and efficient household utensil or tool, and one which has been found to be practicable.

The invention having been set forth, what is claimed as new and useful is:—

In combination with an elongated knife sharpener triangular in cross section; a pair of renewable or replaceable guides, one arranged adjacent each sharpening edge of said sharpener and extending at an angle to the sharpener, thereby forming a V-shaped opening between each guide and the sharpener to receive a knife blade; a handle member having alined three openings, the two end openings being substantially circular, while the central opening is angular in contour, in one side of which angular opening the triangular cross sectional contour of the sharpener is arranged; said guides having lugs, the lugs of the guides and the walls of said circular openings being correspondingly beveled, in order to anchor the guides in position detachably, thereby rendering the guides renewable or replaceable; and a wedge key passing through the other side of the angular opening, and embedding in the guides, thus assisting further in securing the guides and the sharpener detachably in position.

In testimony whereof I have signed my name to this specification in the presence of two subscribing witnesses.

GEORGE G. ROSS.

Witnesses:
L. E. SPENCE,
CHAS. W. COWLEY.